United States Patent [19]

Tasaki

[11] Patent Number: 6,060,526

[45] Date of Patent: May 9, 2000

[54] MIXED BED ION EXCHANGE RESIN SYSTEM AND METHOD OF PREPARATION

[75] Inventor: Shintaro Tasaki, Omiya, Japan

[73] Assignee: Rohm and Haas Company, Philadelphia, Pa.

[21] Appl. No.: 09/226,824

[22] Filed: Jan. 7, 1999

Related U.S. Application Data

[62] Division of application No. 08/962,855, Nov. 3, 1997, Pat. No. 5,902,833.
[60] Provisional application No. 60/031,760, Nov. 26, 1996.

[51] Int. Cl.$^7$ ............................... B01J 43/00; B01J 41/12
[52] U.S. Cl. ................................ 521/28; 521/26; 521/30; 521/33
[58] Field of Search .................................. 521/28, 26, 30, 521/33

[56] References Cited

U.S. PATENT DOCUMENTS

| | | | |
|---|---|---|---|
| 2,961,417 | 11/1960 | Small | 521/28 |
| 3,168,486 | 2/1965 | Small . | |
| 3,262,891 | 7/1966 | Abrams | 521/28 |
| 4,347,328 | 8/1982 | Harmon | 521/28 |

OTHER PUBLICATIONS

"Anion Exchange Resin Kinetic Testing: An Indispensable Diagnostic Tool for Condensate Polisher Troubleshooting" by J.T. McNulty et al., 47$^{th}$ Annual Meeting International Water Conference (IWC–86–54), Pittsburgh, PA (Oct. 27–29, 1986).

"A Discussion of Experimental Ion–Exchange Resin Mass–Transfer Coefficient Methods" by G.L. Foutch et al. (Oklahoma State University, Stillwater, OK), 57$^{th}$ Annual Meeting International Water Conference (IWC–96–46), Pittsburgh, Pa (Oct. 21–24, 1996).

*Primary Examiner*—Fred Zitomer
*Attorney, Agent, or Firm*—Thomas J. Howell

[57] ABSTRACT

A method for preparing non-agglomerating mixed bed ion exchange resin systems without affecting the ion exchange kinetics of the anion exchange resin component of the mixed bed system is disclosed. Pretreatment of the anion exchange resin component with a sulfonated poly(vinylaromatic) polyelectrolyte is particularly effective in providing non-agglomerated mixed bed systems without affecting ion exchange kinetics. Treatment levels of 10 to 800 milligrams per liter of anion exchange resin with sulfonated poly (vinylaromatic) polyelectrolyte having number average molecular weight from 5,000 to 1,000,000 are particularly preferred.

9 Claims, No Drawings

MIXED BED ION EXCHANGE RESIN SYSTEM AND METHOD OF PREPARATION

This application is a divisional of Ser. No. 08/962,855 filed Nov. 3, 1997, now U.S. Pat. No. 5,902,833 which is a provisional of Ser. No. 60/031,760 filed Nov. 26, 1996.

BACKGROUND

This invention concerns a method for preparing non-agglomerating mixed bed ion exchange resin systems without affecting the ion exchange kinetics of the anion exchange resin component of the mixed bed system. More particularly it concerns a method for neutralizing the surface charges of the anion exchanging component of the mixed bed system by treatment with a sulfonated poly(vinylaromatic) polyelectrolyte.

The use of mixed bed ion exchange resins for deionization of aqueous solutions is widespread. Surface interactions between the cationic and anionic resin particles cause clumps or agglomerates of resin to form that lead to poor flow distribution in the bed and hence inefficient operation. Various approaches used to overcome this undesirable agglomeration include treatment with water-insoluble crosslinked ion exchange emulsion particles (U.S. Pat. No. 4,347,328), and treatment with water-soluble resinous polyelectrolytes to neutralize the surface charges of the treated resins (U.S. Pat. No. 2,961,417). Treatment with insoluble ion exchange emulsion particles (U.S. Pat. No. 4,347,328) involves high usage levels and extensive washing of the treated resin to remove the emulsion particles; and treatment with water-soluble resinous polyelectrolytes (U.S. Pat. No. 2,961,417) reduces mixed bed agglomeration but also reduces the ion exchange kinetics of the treated resin, thereby lowering the overall efficiency of the mixed bed system.

Despite the aforementioned attempts to produce non-agglomerating mixed bed ion exchange systems, no previous treatment has been found to be completely effective at low use levels for declumping mixed bed systems efficiently while having negligible effect on the performance (such as ion exchange kinetics) of the treated resins to produce purified water. No one had, heretofore, discovered that if certain water-soluble polyelectrolytes of selected molecular weights were used at specific treatment levels, that the best combination of non-agglomeration and mixed bed ion exchange kinetics could be achieved.

The present invention seeks to overcome the problems of the prior art by providing an improved process for preparing non-agglomerating mixed bed ion exchange systems without significantly affecting the ion exchange kinetics.

SUMMARY OF INVENTION

In one aspect, the present invention is a method for preparing strong base anion exchange resins for use in mixed bed ion exchange systems containing strong base anion exchange resin and strong acid cation exchange resin comprising contacting the anion exchange resin with an effective amount of water-soluble sulfonated poly (vinylaromatic) polyelectrolyte to maintain anion exchange resin kinetics substantially unchanged compared to the anion resin kinetics before contact with the water-soluble sulfonated poly(vinylaromatic) polyelectrolyte and to provide a non-agglomerating mixed bed ion exchange system; wherein the amount of sulfonated poly(vinylaromatic) polyelectrolyte is from 10 to 800 milligrams per liter of anion exchange resin and the number average molecular weight of the sulfonated poly(vinylaromatic) polyelectrolyte is from 5,000 to 1,000,000.

In another aspect, the present invention is a non-agglomerating mixed bed ion exchange system comprising a strong base quaternary ammonium anion exchange resin and a strong acid sulfonated cation exchange resin, wherein the anion exchange resin has been pretreated with 10 to 800 milligrams of water-soluble sulfonated poly(vinylaromatic) polyelectrolyte per liter of anion exchange resin to maintain anion exchange resin kinetics substantially unchanged compared to the anion resin kinetics of the anion exchange resin before being pretreated; wherein the number average molecular weight of the sulfonated poly(vinylaromatic) polyelectrolyte is from 5,000 to 1,000,000.

DETAILED DESCRIPTION

We have found that certain water-soluble polyelectrolyte compositions of selected molecular weights can be used at selected usage levels relative to the anion exchange resin treated to result in unexpectedly improved performance (non-agglomeration and substantially unaffected ion exchange kinetics) of mixed bed ion exchange systems containing the treated anion exchange resins.

The water-soluble sulfonated poly(vinylaromatic) polyelectrolytes useful in the present invention are prepared by the sulfonation of vinylaromatic polymers using conventional sulfonation techniques. The vinylaromatic polymers are prepared by polymerizing vinylaromatic monomers using conventional free radical polymerization techniques. Suitable vinylaromatic monomers include, for example, styrene, α-methylstyrene, vinyltoluene, ethylvinylbenzene, vinylxylene, vinylnaphthalene and mixtures thereof. The sulfonated poly(vinylaromatic) polyelectrolytes may be used either in the free acid form or in any of the water-soluble salt forms, for example, the sodium, potassium or ammonium salts. Preferably the sulfonated poly(vinylaromatic) polyelectrolyte is sulfonated polystyrene. The polyelectrolytes useful in the present invention are water-soluble and therefore contain substantially no crosslinker.

The term "ion exchange resin" is used conventionally herein and refers generally to weak and strong acid cation exchange resins and weak and strong base anion exchange resins of either the gel or macroporous type. Cation exchange resins and anion exchange resins (hereinafter generally referred to as cation resins and anion resins) are well known in the art and reference is made thereto for the purpose of this invention.

Typically, the ion exchange resins employed herein are prepared as spheroidal polymer beads having a volume average particle size from about 0.15 to about 1.0 millimeters (mm) and preferably from about 0.3 to about 0.7 mm, corresponding to 18 to 100 and 20 to 50 mesh (U.S. standard screen size), respectively. Of particular interest are the strong acid cation resins and the strong base anion resins, preferably those resins derived from monovinylidene aromatic monomers, such as styrene or monoalkyl substituted styrene, for example, vinyltoluene, and a copolymerizable crosslinking agent. Preferred crosslinking agents include, for example, the di- or polyvinylidene aromatics, such a divinylbenzene and divinyltoluene, and ethylene glycol dimethacrylate. Particularly preferred strong acid cation resins are the sulfonated copolymers of a monovinylidene aromatic and a copolymerizable crosslinking agent. Particularly preferred strong base anion resins are the crosslinked polymers of a monovinylidene aromatic bearing quaternary ammonium groups. In the preferred cation and anion resins, the monovinylidene aromatic is preferably styrene and the crosslinking agent is preferably divinylbenzene. Among the representative commercial anion exchange resins that are suitable for treatment by the process of the present invention are, for example, Amberlite IRA-402, Amberjet 4400 and Ambersep 900. Among the representative commercial cation exchange resins that are suitable for use in mixed bed systems of the present invention are, for example, Amberlite IR-120, Amberjet 1500 and Ambersep 200. Amberlite, Amberjet and Ambersep are trademarks of Rohm and Haas Company, Philadelphia, Pa., USA.

According to the present invention, the anion resin being treated is contacted with sufficient amounts of the sulfonated poly(vinylaromatic) polyelectrolyte to reduce the surface charge exhibited by the anion resin bead, that is, a neutralizing amount. By the term "reduce the surface charge" it is meant that the surface charge of the anion resin bead treated with the sulfonated poly(vinylaromatic) polyelectrolyte is reduced when compared to the surface charge of an anion resin that has not been treated. The reduction in surface charge of the treated anion resin is indicated by the reduction in the agglomeration (clumping) between the treated anion resin and an ion exchange resin of different ionic character, that is, cationic.

The reduction in agglomeration is readily measured using conventional techniques such as that described in Example 1. Table I summarizes the effect of treatment with different levels of sulfonated poly(vinylaromatic) polyelectrolyte (sulfonated polystyrene, acid form) of different number average molecular weights ($M_n$) on the agglomeration characteristics of the corresponding mixed bed resin systems. A satisfactory level of non-agglomeration was indicated when the surface charge of the treated anion resin was reduced such that the tapped volume of a mixture of treated anion exchange resin and strong acid cation exchange resin was no more than about 30 percent (%), preferably no more than about 20%, and more preferably no more than 10% (by volume), greater than the combined volume of the separate anion and cation resins; for example, 100 milliliters (ml)= 0%, 110 ml=10%, 180 ml=80% agglomeration in Table I. Most preferably, the tapped volume of the resin mixture was essentially equal to the combined volumes of the individual resins, indicating substantially no agglomeration.

Evaluation of the durability of the anion resin treatment was conducted by subjecting an anion resin sample treated with 27 milligrams/liter (mg/l) of sulfonated polystyrene (acid form, $M_n$=20,000) to six consecutive exhaustion/ regeneration cycles (resin treated with 60 grams NaCl per liter of resin, rinsed with deionized water, treated with 200 grams NaOH per liter of resin, rinsed with deionized water) and retesting the anion resin (hydroxide form) for agglomeration characteristics when used in a mixed bed system. The effectiveness of the non-agglomeration treatment was unchanged after the six exhaustion/regeneration cycles, that is, similar to that shown in Table I.

TABLE I

Mixed Bed Agglomeration Test

| Treatment Level (mg/l resin) | Settled Volume (ml) | Tapped Volume (ml) |
|---|---|---|
| Comparative = 0 | 240 | 180 |
| $M_n$ = 20,000 | | |
| 25 | 114 | 102 |
| 50 | 112 | 101 |

TABLE I-continued

Mixed Bed Agglomeration Test

| Treatment Level (mg/l resin) | Settled Volume (ml) | Tapped Volume (ml) |
|---|---|---|
| 75 | 113 | 102 |
| 100 | 110 | 100 |
| $M_n$ = 50,000 | | |
| 25 | 116 | 112 |
| 50 | 115 | 102 |
| 75 | 113 | 101 |
| 100 | 114 | 101 |
| $M_n$ = 500,000 | | |
| 25 | 116 | 103 |
| 50 | 114 | 103 |
| 75 | 113 | 102 |
| 100 | 112 | 101 |
| $M_n$ = 1,000,000 | | |
| 25 | 116 | 103 |
| 50 | 113 | 102 |
| 75 | 112 | 102 |
| 100 | 112 | 101 |

Additional resin treatment/agglomeration evaluations were conducted as described in Example 1A using sulfonated polystyrene, sodium salt form (sodium polystyrenesulfonate), of varying molecular weights. Table 1A summarizes these data (ND=not determined). The data in Table IA indicate that use of the free acid form of the sulfonated poly(vinylaromatic) polyelectrolyte is more preferred than that of the sodium salt form. The treatment was not as effective in preventing agglomeration after multiple exhaustion/regeneration cycles when the lower molecular weight sulfonated poly(vinylaromatic) polyelectrolytes were used ($M_n$=14,500 and below) versus the higher molecular weight sulfonated poly(vinylaromatic) polyelectrolytes ($M_n$=above 20,000).

TABLE IA

Mixed Bed Agglomeration Test

| Molecular Weight $(M_n)$[a] | Settled Volume (ml) | Tapped Volume (ml) |
|---|---|---|
| Comparative = 0 mg/l | >200 | ND |
| 1,400 | >200 | ND |
| 5,900 | 170–190[b] | ND |
| 14,500 | 154–180[b] | 130 |
| 20,000 (H form) | 114 | ND |
| 20,000 (H form)[c] | 112[c] | 101[c] |
| 28,200 | 146–170[b] | 116 |
| 28,200 (H form) | 108 | 100 |
| 80,000 | 143–160[b] | ND |
| 177,000 | 140–156[b] | ND |

[a]= treatment levels were 50–56 mg (sodium polystyrensulfonate, unless indicated otherwise) per liter of anion resin
[b]= agglomeration results initially & after four exhaustion/regeneration cycles, respectively.
[c]= from Example 1/Table I A common practice among industrial users of mixed bed ion exchange systems is to characterize resin kinetic properties by determining mass transfer coefficients for the resins. Experimentally measured mass transfer coefficients (MTC) under an established set of conditions may be used to estimate the potential performance and projected degree of deterioration of ion exchange kinetics of mixed bed ion exchange systems. MTC is a parameter that includes both film and particle effects in the characterization of ion exchange resin kinetics. The accepted methodology and interpretations of ion exchange kinetics and the use of mass transfer coefficients in mixed bed ion exchange systems are disclosed in "Anion Exchange Resin Kinetic Testing: An Indispensable Diagnostic Tool for Condensate Polisher Troubleshooting" by J. T. McNulty et al., 47th Annual Meeting International Water Conference (IWC-86-54), Pittsburgh, Pa. (Oct. 27–29, 1986) and in "A Discussion of Experimental Ion-Exchange Resin Mass-Transfer Coefficient Methods" by G. L. Foutch et al. (Oklahoma State University, Stillwater, Okla.), 57th Annual Meeting International Water Conference (IWC-96-46), Pittsburgh, Pa. (Oct. 21–24, 1996). Example 2 describes the method used to generate MTC data for the treated anion resins of the present invention using a dynamic kinetic mixed bed ion exchange resin evaluation. Sulfate ion kinetics are known to be more indicative of detecting changes in ion exchange kinetics of fouled anion exchange resins than are chloride ion kinetics; therefore, sulfate ion MTC data were used to evaluate the effect of sulfonated poly(vinylaromatic) polyelectrolyte treatment on anion resin kinetics. Sulfate ion mass transfer coefficients for unused anion exchange resins are typically $2.0–2.5\times10^{-4}$ meters/second (m/s) (see J. T. McNulty et al).

For the purposes of the present invention maintaining anion exchange resin kinetics "substantially unchanged" compared to the anion resin kinetics before contact with the water-soluble sulfonated poly(vinylaromatic) polyelectrolyte means that treated anion resins having sulfate ion MTC values greater than at least about 75% of the sulfate ion MTC of the untreated anion resin are considered to have satisfactory ion exchange kinetics; sulfate ion MTC values of the treated resin of greater than about 80% of the untreated anion resin are preferred and values greater than about 90% are most preferred for satisfactory anion exchange resin kinetics. Table II summarizes the effect of different levels of sulfonated poly(vinylaromatic) polyelectrolyte on the sulfate ion MTC characteristics of the treated anion resin. Relative values of sulfate ion MTC compared to the untreated sulfate ion MTC value are shown in parentheses in the last column of Table II; a value of $2.5\times10^{-4}$ m/s was used as the value for untreated anion resin sulfate ion MTC for the purposes of comparisons with treated resins.

TABLE II

Anion Resin Kinetics (Mass Transfer Properties)

| Treatment Level (mg/l resin) | Inlet Sulfate, $C_o$ (ppb) | Outlet Sulfate, C (ppb) | Outlet Resistivity (MΩ-cm) | Sulfate MTC ($\times 10^{-4}$ m/s) |
|---|---|---|---|---|
| Comparative = 0 | 177 | 11.2 | 9.1 | 2.3 (92) |
| $M_n = 20,000$ | | | | |
| 25 | 177 | 9.3 | 10.4 | 2.5 (100) |
| 50 | 180 | 11.6 | 8.9 | 2.3 (92) |
| 75 | 180 | 10.4 | 9.6 | 2.4 (96) |
| 100 | 175 | 9.7 | 10.1 | 2.4 (96) |
| 400 | 180 | 11.2 | 9.1 | 2.4 (96) |
| 800 | 186 | 12.7 | 8.3 | 2.3 (92) |
| $M_n = 50,000$ | | | | |
| 25 | 165 | 7.1 | 12 | 2.6 (100) |
| 50 | 165 | 10.9 | 9.2 | 2.3 (92) |
| 100 | 170 | 13.7 | 7.8 | 2.1 (84) |
| 200 | 165 | 18.6 | 6 | 1.9 (76) |
| $M_n = 500,000$ | | | | |
| 25 | 170 | 9.3 | 10.3 | 2.5 (100) |
| 50 | 165 | 18.1 | 6.1 | 1.9 (76) |
| 100 | 170 | 25.4 | 4.5 | 1.6 (64) |

TABLE II-continued

Anion Resin Kinetics (Mass Transfer Properties)

| Treatment Level (mg/l resin) | Inlet Sulfate, $C_o$ (ppb) | Outlet Sulfate, C (ppb) | Outlet Resistivity (MΩ-cm) | Sulfate MTC ($\times 10^{-4}$ m/s) |
|---|---|---|---|---|
| $M_n = 1,000,000$ | | | | |
| 25 | 175 | 17.5 | 6.3 | 2.0 (80) |
| 50 | 175 | 24.6 | 4.6 | 1.7 (68) |
| 75 | 175 | 27.3 | 4.2 | 1.6 (64) |
| 100 | 175 | 38 | 3 | 1.3 (52) |

The amount of sulfonated poly(vinylaromatic) polyelectrolyte employed to reduce the surface charge of the treated anion resin by the desired amount will vary depending on several factors, such as the composition and molecular weight of the sulfonated poly(vinylaromatic) polyelectrolyte and the composition of the anion resin being treated. Typically, the sulfonated poly(vinylaromatic) polyelectrolyte can be used in an amount ranging from 10 to 800 mg/l of anion exchange resin, preferably from 10 to 200 mg/l, more preferably from 20 to 100 mg/l, and most preferably from 20 to 75 mg/l, depending upon the molecular weight of the sulfonated poly(vinylaromatic) polyelectrolyte.

The water-soluble sulfonated poly(vinylaromatic) polyelectrolytes useful in the process of the present invention have number average molecular weights ($M_n$) ranging from 5,000 to 1,000,000, preferably from 10,000 to 500,000, more preferably from 10,000 to 100,000, and most preferably from 15,000 to 50,000. Number average molecular weights are based on aqueous phase (0.015 Molar sodium sulfate, pH adjusted to 6.5) gel permeation chromatography (GPC) using appropriate molecular weight standards of sulfonated polystyrene.

The detrimental effect of higher molecular weight sulfonated poly(vinylaromatic) polyelectrolyte on ion exchange kinetics is apparent from data in Table II: values of sulfate ion MTC for resins treated with greater than about 25 mg/l of sulfonated polystyrene, having $M_n$ of 500,000 or greater, are less than 80% of the sulfate ion MTC of the untreated resin. At low $M_n$ values, for example from about 5,000 to 30,000, satisfactory treatment levels of the sulfonated poly(vinylaromatic) polyelectrolyte are from 10 to 800 mg/l of anion exchange resin, preferably from 15 to 100 mg/l, and more preferably from 20 to 75 mg/l. At intermediate $M_n$ values, for example from 30,000 to 100,000, satisfactory treatment levels of the sulfonated poly (vinylaromatic) polyelectrolyte are from 10 to 150 mg/l of anion exchange resin, preferably from 10 to 100 mg/l, and more preferably from 20 to 60 mg/l. At higher $M_n$ values, for example from 100,000 to 500,000, satisfactory treatment levels of the sulfonated polyelectrolyte are from 10 to 100 mg/l of anion exchange resin, preferably from 10 to 75 mg/l, and more preferably from 15 to 50 mg/l. As the number average molecular weight of the sulfonated polyelectrolyte increases, the allowed treatment level must be correspondingly decreased in order to show substantially no effect on the ion exchange kinetics.

In order to provide a balance of minimum treatment time, minimum effect on ion exchange kinetics and satisfactory non-agglomeration of the mixed bed systems, the preferred treatment levels of the lower molecular weight sulfonated polyelectrolyte are (a) from 10 to 200 mg/l, and more preferably from 20 to 100 mg/l, of anion exchange resin for sulfonated poly(vinylaromatic) polyelectrolyte having $M_n$ from 10,000 to 500,000, (b) from 15 to 100 mg/l, and more preferably from 20 to 75 mg/l, of anion exchange resin for sulfonated poly(vinylaromatic) polyelectrolyte having $M_n$ from 10,000 to 100,000, and (c) from 15 to 75 mg/l, and more preferably from 20 to 60 mg/l, of anion exchange resin for sulfonated poly(vinylaromatic) polyelectrolyte having $M_n$ from 15,000 to 50,000.

In the practice of this invention, the sulfonated poly (vinylaromatic) polyelectrolyte and anion resin (water-swollen condition) being treated are mixed at conditions sufficient to provide intimate contact between the anion exchange resin and the sulfonated poly(vinylaromatic) polyelectrolyte. In general, mild agitation of the admixture is sufficient to provide such contact. After providing the required contact period, the treated anion exchange resin is advantageously washed with water until any excess sulfonated poly(vinylaromatic) polyelectrolyte has been removed therefrom.

In preparing a mixed bed system of anion and cation exchange resins that exhibits non-agglomeration, the anion resin is initially treated with a dilute aqueous solution of the sulfonated poly(vinylaromatic) polyelectrolyte, washed free of sulfonated poly(vinylaromatic) polyelectrolyte and the treated resin subsequently admixed with the untreated cation exchange resin. Alternatively, but less preferred, the anion and cation resins can be first mixed and the sulfonated poly(vinylaromatic) polyelectrolyte admixed with the mixed resin bed to reduce the surface charge exhibited by anion resin type. The anion resin to be treated may be either in the hydroxide or chloride form; the sulfonated poly (vinylaromatic) polyelectrolyte may be used either in the free acid form or its salt form, for example, the sodium salt; preferably, the sulfonated poly(vinylaromatic) polyelectrolyte is used in the free acid form.

Some embodiments of the invention are described in detail in the following Examples. All ratios, parts and percentages (%) are expressed by weight unless otherwise specified, and all reagents used are of good commercial quality unless otherwise specified.

EXAMPLE 1

Sulfonated polystyrene (sodium form) as a 0.2% (by weight) aqueous solution was converted to the free acid form by passage through an ion exchange column of commercially available strong acid cation exchange resin.

The strong base anion resin (Amberjet 4400) to be treated was converted to the hydroxide form by column treatment with excess sodium hydroxide and rinsed free of excess base. The converted anion resin was placed in a backwash column with an equal volumn of deionized water and the required amount of polystyrene sulfonic acid solution was added to the backwash column while agitating and mixing with nitrogen gas flow. After five minutes of mixing, the deionized water was drained from the treated resin and the resin was rinsed with two bed volumes of additional deionized water.

To determine the degree of agglomeration, an amount of the treated strong base anion resin beads was combined with an amount of commercially available strong acid cation exchange resin beads (Amberjet 1500). The individual amounts of anion and cation resin used corresponded to a volume of approximately 55 ml upon settling (1 minute) and a volume of 50 ml upon tapping the settled beads. The mixture of cation resin and treated anion resin was shaken well and the resins allowed to settle (1 minute). Upon settling, the volume of the resin mixture ranged from 110–115 ml. This volume was identical to the combination of settled volumes of the individual resins indicating that the sulfonated polystyrene effectively reduced the charge interaction of the anion and cation resins. Upon tapping the settled resin mixture, the resin volume was further reduced to 100–105 ml, again indicating the effectiveness of the sulfonated polystyrene in reducing the surface charge exhibited by the anion exchange resin. Table I summarizes the agglomeration data for treatment with sulfonated polystyrenes (acid form) having $M_n$ values of 20,000 (range from 10,000 to 30,000), 50,000 (range from 50,000 to 100,000) 500,000 (range from 400,000 to 600,000) and 1,000,000 (range from 800,000 to 1,200,000).

For purposes of comparison, 50 ml (tapped volume) of identical anion resin beads which had not been treated with the sulfonated polystyrene were combined with 50 ml (tapped volume) of identical cation resin beads. Following agitation and mixing of the resins, the settled volume of this combination was 240 ml or 125–130 ml more than the combined volume of the individual settled volumes of the anion and cation resins, indicating significant charge interaction between the anion and cation exchange resins. Similarly, upon tapping the settled mixture, the tapped volume was 180 ml or 75–80 ml more than the combined tapped volume of the individual resins, again confirming significant charge interaction and agglomeration between the anion and cation resins (see Table I, comparative).

EXAMPLE 1A

In a manner similar to that described in Example 1, additional resin agglomeration testing was conducted using sulfonated polystyrene samples of different molecular weights. The sulfonated polystyrenes (sodium form) used in this study were based on polymers used as molecular weight standards and had narrower molecular weight distributions than the sulfonated polystyrenes used in Examples 1 and 2. These sulfonated polystyrenes had $M_n$ values of 1,400 (range from about 1,000 to 1,800), 5,900 (range from about 5,500 to 6,500) 14,500 (range from about 13,000 to 16,000), 28,200 (range from about 26,000 to 30,000), 80,000 (range from about 75,000 to 90,000) and 177,000 (range from about 160,000 to 190,000).

The strong base anion resin (hydroxide form, 100 ml drained resin with 75 ml deionized water) was treated with the required amount of sodium polystyrenesulfonate (approximately 5 mg in 25 ml of deionized water) in a 237-ml jar and mixed on a roller-mill for 30 minutes; this treatment level corresponded to 50 to 56 mg/l resin. The treated anion resin samples were then rinsed with one liter of deionized water on a filter tube. The rinsed treated anion resin (25 ml) was then combined with 25 ml of strong acid cation exchange resin and approximately 50 to 60 ml of deionized water in a 100-ml graduated cylinder; the graduated cylinder was inverted 4 to 5 times to mix the resins. The mixed resin system was then allowed to settle and the final settled volume (1 minute) was measured; final tapped volumes were also measured on some of the test samples. The data summarized in Table 1A reports the settled and tapped volumes as twice (2X) the actual measured volumes to put the data on the same scale as that reported in Table I (only ½ the amount of resin was used in this test method, IA, compared to that used in Example 1).

In a manner similar to that described in Example 1, the durability of the anion resin treatment was evaluated for these treated resins. The treated anion resins were subjected to four consecutive exhaustion/regeneration cycles (rinsed with 4% aqueous HCl, followed by rinse with deionized water, rinsed with 4% aqueous NaOH, followed by rinse with deionized water) and the tendency to agglomerate was remeasured (resin in hydroxide form). Results are summarized in Table 1A.

EXAMPLE 2

To determine the effectiveness of various mixed bed systems in providing purified water, that is, removing ions from solution, the ion exchange kinetics were evaluated as described below. A mixed bed system was prepared by combining 53.3 ml of strong acid cation exchange resin and 26.7 ml of strong base anion exchange resin (treated by process of the present invention according to Example 1) into an ion exchange column (23.5 mm diameter). An aqueous solution of sodium sulfate ($C_0$=initial sulfate concentration=approximately 180 parts per billion (ppb) sulfate ion, based on weight of aqueous solution) was then passed through the mixed bed system at 866 ml/minute while measuring the resistivity of the liquid exiting the column. The inlet resistivity was approximately 2 MegOhm-cm (M$\Omega$-cm) and the sulfate leakage level was determined from the outlet resistivity level (C=sulfate level in effluent in ppb). Sulfate ion MTC values were calculated according to the methods disclosed in McNulty et al. and Foutch et al., taking into account the particle size of the resin evaluated, ion concentrations, bed geometry, anion/cation resin ratio and liquid flow rates. See Table II for summary of data.

We claim:

1. A non-agglomerating mixed bed ion exchange system comprising a strong base quaternary ammonium anion exchange resin and a strong acid sulfonated cation exchange resin, wherein the anion exchange resin has been pretreated with 15 to 100 milligrams of water-soluble sulfonated poly(vinylaromatic) polyelectrolyte per liter of anion exchange resin to maintain anion exchange resin kinetics substantially unchanged compared to the anion resin kinetics of the anion exchange resin before being pretreated; wherein the pretreated anion resin has a sulfate ion mass transfer coefficient of at least $1.5\times10^{-4}$ meters/second; wherein the pretreated anion resin has a sulfate ion mass transfer coefficient value greater than at least about 80% of the sulfate ion mass transfer coefficient of the anion exchange resin before being pretreated; and wherein the number average molecular weight of the sulfonated poly(vinylaromatic) polyelectrolyte is from 10.000 to 100.000.

2. The mixed bed ion exchange system of claim 1 wherein the sulfonated poly(vinylaromatic) polyelectrolyte is sulfonated polystyrene, acid form.

3. A non-agglomerating mixed bed ion exchange system comprising a strong base quaternary ammonium anion exchange resin and a strong acid sulfonated cation exchange resin, wherein (i) the anion exchange resin has been pretreated with 10 to 75 milligrams of water-soluble sulfonated poly(vinylaromatic) polyelectrolyte per liter of anion exchange resin to maintain anion exchange resin kinetics substantially unchanged compared to the anion resin kinetics of the anion exchange resin before being pretreated; wherein the pretreated anion resin has a sulfate ion mass transfer coefficient of at least $1.5\times10_{-4}$ meters/second; (ii) the number average molecular weight of the sulfonated poly(vinylaromatic) polyelectrolyte is from 100,000 to 500,000; and (iii) the pretreated anion resin has a sulfate ion mass transfer coefficient value greater than at least about 75% of the sulfate ion mass transfer coefficient of the anion exchange resin before being pretreated.

4. The mixed bed ion exchange system of claim 3 wherein (i) the anion exchange resin has been pretreated with 15 to 50 milligrams of water-soluble sulfonated poly(vinylaromatic) polyelectrolyte per liter of anion exchange resin.

5. A non-agglomerating mixed bed ion exchange system comprising a strong base quaternary ammonium anion exchange resin and a strong acid sulfonated cation exchange resin, wherein (i) the anion exchange resin has been pretreated with 15 to 100 milligrams of water-soluble sulfonated poly(vinylaromatic) polyelectrolyte per liter of anion exchange resin to maintain anion exchange resin kinetics substantially unchanged compared to the anion resin kinetics of the anion exchange resin before being pretreated; wherein the pretreated anion resin has a sulfate ion mass transfer coefficient of at least $1.5\times10^{-4}$ meters/second; (ii) the number average molecular weight of the sulfonated poly(vinylaromatic) polyelectrolyte is from 5,000 to 30,000; and (iii) the pretreated anion resin has a sulfate ion mass transfer coefficient value greater than at least about 80% of the sulfate ion mass transfer coefficient of the anion exchange resin before being pretreated.

6. A non-agglomerating mixed bed ion exchange system comprising a strong base quaternary ammonium anion exchange resin and a strong acid sulfonated cation exchange resin, wherein (i) the anion exchange resin has been pretreated with 10 to 100 milligrams of water-soluble sulfonated poly(vinylaromatic) polyelectrolyte per liter of anion exchange resin to maintain anion exchange resin kinetics substantially unchanged compared to the anion resin kinetics of the anion exchange resin before being pretreated; wherein the pretreated anion resin has a sulfate ion mass transfer coefficient of at least $1.5\times10^{-4}$ meters/second; (ii) the number average molecular weight of the sulfonated poly(vinylaromatic) polyelectrolyte is from 30,000 to 100,000; and (iii) the pretreated anion resin has a sulfate ion mass transfer coefficient value greater than at least about 80% of the sulfate ion mass transfer coefficient of the anion exchange resin before being pretreated.

7. The mixed bed ion exchange system of claim 1 wherein (i) the anion exchange resin has been pretreated with 15 to 75 milligrams of water-soluble sulfonated poly(vinylaromatic) polyelectrolyte per liter of anion exchange resin and (ii) the number average molecular weight of the sulfonated poly(vinylaromatic) polyelectrolyte is from 15,000 to 50,000.

8. A non-agglomerating mixed bed ion exchange system comprising a strong base quaternary ammonium anion exchange resin and a strong acid sulfonated cation exchange resin, wherein (i) the amount of sulfonated poly(vinylaromatic) polyelectrolyte is from 10 to 50 milligrams per liter of anion exchange resin to maintain anion exchange resin kinetics substantially unchanged compared to the anion resin kinetics of the anion exchange resin before being pretreated; wherein the pretreated anion resin has a sulfate ion mass transfer coefficient of at least $1.5\times10^{-4}$ meters/second; (ii) the number average molecular weight of the sulfonated poly(vinylaromatic) polyelectrolyte is from 10,000 to 500,000; and (iii) the pretreated anion resin has a sulfate ion mass transfer coefficient value greater than at least about 75% of the sulfate ion mass transfer coefficient of the anion exchange resin before being pretreated.

9. The mixed bed ion exchange system of claim 1 wherein the pretreated anion resin has a sulfate ion mass transfer coefficient of at least $2.0\times10^{-4}$ meters/second.

* * * * *